Jan. 12, 1943.  E. H. VEDDER  2,308,254
DISCHARGE APPARATUS
Original Filed Aug. 17, 1938

WITNESSES:
E. A. McCloskey
John R. Shipman

INVENTOR
Edwin H. Vedder.
BY
Hymen Diamond
ATTORNEY

Patented Jan. 12, 1943

2,308,254

UNITED STATES PATENT OFFICE 2,308,254

DISCHARGE APPARATUS

Edwin H. Vedder, Forest Hills, Pa., assignor to Westinghouse Electric & Manufacturing Company, East Pittsburgh, Pa., a corporation of Pennsylvania Original application August 17, 1938, Serial No. 225,368. Divided and this application August 5, 1941, Serial No. 405,473

7 Claims. (Cl. 250—27)

My invention relates to electric discharge apparatus and has particular relation to discharge apparatus for controlling the supply of current to a load requiring power in intermittent pulses such as a resistance spot and seam welding load, for example.

This application is a division of application, Serial No. 225,368, filed August 17, 1938.

The present invention also relates to an application Serial No. 214,160, filed June 16, 1938, by me and Russell W. Staggs, and assigned to the Westinghouse Electric & Manufacturing Company, and is an extension of the invention disclosed therein.

In the last-mentioned application, apparatus is disclosed that incorporates electric discharge valves of the immersed-ignition-electrode type through which current is generally supplied from an alternating current source to a load requiring power in intermittent pulses. By the proper selection of the ignition electrodes of the discharge valves, and by the proper adjustment of the circuit in which they are connected, the load current variations are maintained within limits as regards both the current-time product and the magnitude of the individual sub-impulses which form a main impulse.

As is explained in the aforesaid application, the load supplied in the practice of the invention disclosed often has a poor power factor and the supply of the pulses is initiated at random. The magnitude of the variations produced is dependent on the relationship between the angle in the half-cycles of the source at which the valves are rendered conductive and the angle at which current zero occurs. The former I shall designate herein as the ignition angle, the latter as the power factor angle.

In accordance with the invention disclosed in the aforesaid application, variations in the current-time product and the magnitudes of the sub-impulses are limited by so selecting the ignition electrodes and their circuits that the ignition angle is of the same order of magnitude as the power factor angle. However, no simple means is made available in accordance with the said invention for adjusting the ignition angle with any degree of precision at a definite value and no simple contrivance for varying the current flow through the load over a wide range is provided.

It is, accordingly, an object of the present invention to provide an arrangement of simple structure in accordance with the aforesaid application, in which the ignition angle shall be adjustable at will.

A more general object of my invention is to provide a control system incorporating an electric discharge valve of the immersed ignition electrode type, in which the instant at which the valve is rendered conductive shall be adjustable at will by the proper adjustment of the ignition circuit.

Another general object of my invention is to provide an arrangement of simple structure for supplying a load from an alternating source wherein the supply of power shall be initiated at instants in the half periods of the source which may be selected at will.

Still another general object of my invention is to provide apparatus for supplying a load from an alternating current source through electric discharge valve means of the immersed ignition electrode type, in which the impedance of the ignition circuit shall be varied at will to vary the instants in the half periods of the source at which the valve means is rendered conductive.

A more specific object of my invention is to provide a resistance spot and seam welding system of simple structure incorporating the feature of heat control.

A still further object of my invention is to provide an electric discharge valve of the immersed ignition electrode type that shall be particularly adaptable for use in apparatus in which the ignition electrode is to be supplied continuously or for relatively long intervals of time with current when the valve is in operation.

More concisely stated, it is an object of my invention to provide simple and tractable apparatus for supplying current to a load requiring power in intermittent pulses, by the operation of which the magnitude of the pulses supplied shall be variable over a wide range.

According to my invention, the ignition potential for the electric discharge valves is derived from the same source as the anode-cathode potential. However, in the ignition circuit impedance means, such as voltage dividers, variable reactors or other induction regulators are interposed to properly set the ignition potential supplied to attain the desired ignition characteristics.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which:

Figure 1:
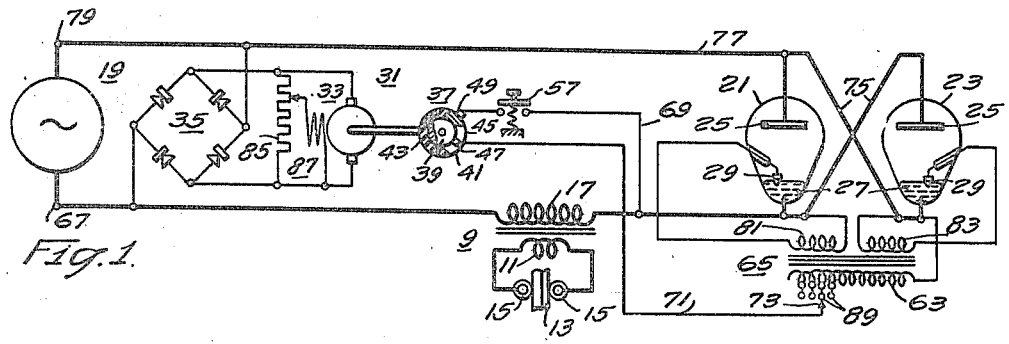
Figure 1 is a diagrammatic view showing an embodiment of my invention.

The apparatus shown in Fig. 1 is a resistance seam welding system comprising a welding transformer 9 from the secondary 11 of which current impulses are supplied to a material 13 to be welded through a pair of welding electrodes 15. The primary 17 of the welding transformer is connected to a suitable source 19 of alternating current, which may be an ordinary commercial 60-cycle source, through a pair of electric discharge valves 21 and 23 of the immersed ignition electrode type. Each of the valves has an anode 25 composed of nickel, carbon or other suitable material, a cathode 27 consisting of a pool of mercury or like material, and an ignition electrode 29 composed preferably of boron carbide but in certain cases also of silicon carbide or other materials. The valves 21 and 23 are connected between the source 19 and the load 9—13 in anti-parallel.

In seam welding apparatus, the current is supplied in the form of discrete impulses; each impulse consists of a train of sub-impulses, one sub-impulse flowing during each half period of the source. To measure out the welding current impulses, a timing system 31 comprising a direct current motor 33 which is supplied from the source 19 through a rectifier 35 and which drives a commutator 37 is provided. The commutator 37 is provided with an inner completely conducting ring 39 and an outer ring 41 in metallic engagement with the inner ring. The outer ring 41 has an insulating segment 43 extending over a portion of its periphery and a conducting segment 45 extending over the remainder. Brushes 47 and 49 engage the inner and outer rings 43 and 45, respectively, and are, in turn, connected in a circuit including a suitable circuit closing element 57 which may be a foot switch, a push button, or the like.

When power is supplied to the system and the switch 57 is closed, a circuit through the primary 63 of an ignition transformer 65 is closed and opened wth a periodicity dependent on the speed of rotation of the commutator 37 and for intervals, depending on the relative lengths of the conducting and insulating segments. The circuit extends from the lower terminal 67 of the source 19 through the primary 17 of the welding transformer 9, a conductor 69, the switch 57, the conducting segment 45 of the commutator 37, a conductor 71, the adjustable tap 73 of the primary 63 of the ignition transformer 65, the selected turns of the primary 63, a conductor 75, a conductor 77, to the upper terminal 79 of the supply source.

The primary 63 of the ignition transformer 65 is thus connected across the electric discharge valves 21 and 23, and when the latter are not carrying current, the potential of the source is impressed between its terminals. The transformer 65 is provided with a pair of secondaries 81 and 83, the former 81 being directly connected between the ignition electrode 29 and the cathode 27 of the discharge valve 21 and the latter 83 being directly connected between the corresponding electrodes of the other valve 23. Accordingly, when the ignition transformer 65 is energized by the source, a potential is impressed across the ignition electrodes 29 of the valves 21 and 23. For a predetermined polarity of the source potential, one or the other of the ignition electrodes 29 is supplied with a positive half wave of potential at the same time that positive anode-cathode potential is impressed on its valve 21 or 23. The ohmic resistance of the ignition electrode is large as compared to the reactive impedance in the ignition circuits and, therefore, the anode-cathode potential and the potential impressed on the ignition electrode may be assumed to be in phase. When during any positive half-cycle the potential across one ignition electrode 29 rises to a sufficiently high value, the corresponding valve is rendered conductive. After the valve becomes conductive, the potential across the primary 63 of the control transformer 65 is reduced to the arc drop value, which is of the order of 10 to 20 volts and, therefore, the flow of substantial current through the ignition electrode is interrupted. As the source potential varies in polarity, the valves 21 and 23 are alternately rendered conductive and alternating current pulses are supplied to the material to be welded in rhythm with the half-cycles of the source.

Impulses made up of trains of half-cycle sub-impulses are thus supplied for intervals of time determined by the length and the speed of rotation of conducting segment 45 of the commutator 37. The number of sub-impulses which make up an impulse and, therefore, the time of supply of each welding impulse or the number of welds per unit time, may be varied or regulated by controlling the speed of the motor 33. The latter object is accomplished in a simple manner by varying the resistance 85 in the field circuit 87 of the motor. The time between impulses is, of course, dependent on the length and speed of the insulating segment 43. The ratio of the welding time to the pause may be varied by varying the relative lengths of the conducting and insulating segments 45 and 43. The measuring out of a predetermined number of sub-impulses to make up a welding impulse is known in the art as the timing of the supply of welding current. In addition to the timing, another desideratum in welding is heat control, i. e., the control of the heating of the material to be welded during the welding operation.

The heat supplied by the welding current is dependent on the magnitude of the welding current which flows and, therefore, on the magnitude of the sub-impulses. In the present case, the magnitude of the sub-impulses is dependent on the angle in the half-cycles of the source at which the sub-impulses current flow is initiated and this angle, in turn, is simply the ignition angle. To control the heat supplied during welding, therefore, the ignition angle is controlled. This object may be accomplished by setting the amplitude of the ignition potential at the desired values; that is to say, by engaging the movable tap 73 with the proper fixed tap 89 of the ignition transformer secondary 63.

I have found that if an ignition electrode 29 is continuously, or for relatively long time intervals, supplied with current, it may become deteriorated by reason of the heat developed by the flow of current. In the embodiment of my invention disclosed in Fig. 1, this undesirable feature is eliminated by the connection of the primary 63 of the ignition transformer 65 in such manner that its potential is reduced to the arc drop value when the load is rendered conductive.

Figure 2:
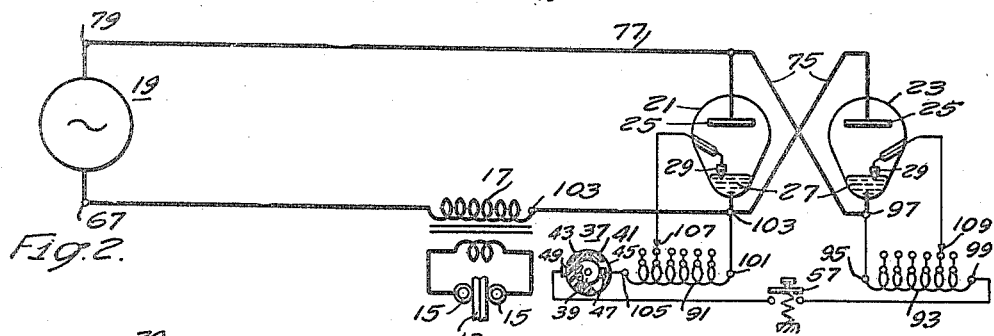
Fig. 2 is a diagrammatic view showing a modification of my invention.

In the modification disclosed in Fig. 2, the ignition transformer 65 is replaced by a voltage divider consisting of a pair of variable reactors 91 and 93. One of the reactors 93 is connected at one of its terminals 95 to the common junction point 97 of the terminal 79 of the source 19 and the cathode 27 of one of the valves 23, and at its other terminal 99 to one of the fixed contacts of the switch 57. The other reactor 91 is connected at one terminal 101 to the common junction point of the terminal 103 of the primary 17 of the welding transformer 9 that is remote from the source 19 and the other cathode 27 and at its other terminal 105 to the remaining fixed contact of the switch 57. The movable taps 107 and 109 of the reactors 91 and 93, respectively, are connected each to an ignition electrode 29 of valves 21 and 23, respectively. When the push button 57 is closed, potentials determined by the setting of the adjustable contacts 107 and 109 of the voltage divider 91—93 are impressed across the ignition electrodes 29 and the valves are rendered conductive at instants in the half periods of the source 19 predetermined by the settings.

Figure 3:
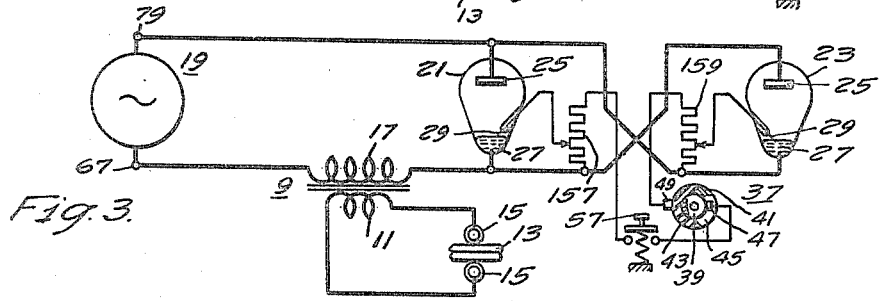
Fig. 3 is a diagrammatic view showing a further modification of my invention.

The Fig. 3 modification is similar to the Fig. 2 modification, except that the voltage divider consists of a pair of resistance elements 157 and 159 rather than a pair of reactance elements 91 and 93. The latter arrangement has the advantage that whatever phase displacement between the source potential and the potential impressed across the ignition electrodes may be introduced by reactors such as 91 and 93 is entirely eliminated.

Figure 4:
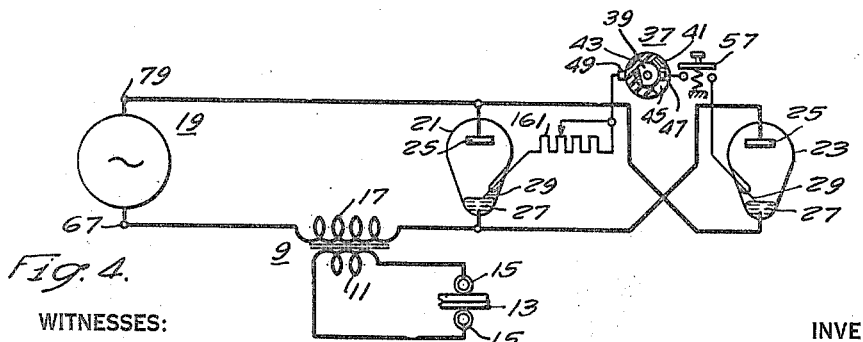
Fig. 4 is a diagrammatic view showing still another modification of my invention.

In the Fig. 4 modification, the ignition electrodes are interconnected through a rheostat 161 when the push button 57 is closed. By reason of this interconnection, the ignition electrodes 29 are connected across the source through the rheostat 161 when the valves are non-conductive. The potential drop across the ignition electrodes 29 is dependent on the setting of the rheostat. For a predetermined setting of the rheostat, the potential impressed across the ignition electrodes 29 rises to the ignition value at a predetermined point in the half periods of the source. By the operation of the rheostat 161, therefore, the point of ignition in the half periods of the source may be set at will.

It is to be noted further that while my invention has been disclosed herein as applied in a seam welding system, it has general applicability and may be used wherever the supply of power to a load is to be controlled. In particular, it may be used with advantage in a spot welding system such, for example, as is shown in the above-mentioned application to Staggs and myself.

Further in the modifications, it is to be noted that while in the preferred practice of my invention two distinct discharge valves are connected in anti-parallel to pass alternating current, the use of a single tube having two mercury pool cathodes with an ignition electrode immersed in each and two anodes is understood to be within the scope of my invention. When I use the expression "in effect," a pair of valves hereinafter, I mean thereby both the two-valve arrangement as disclosed, and the single-tube arrangement just described.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, an electric discharge device of the immersed ignition electrode type having a plurality of principal electrodes and a control electrode immersed in one of said principal electrodes, a source of periodically pulsating potential, means for impressing a potential from said source between said principal electrodes, and voltage divider means energized from said source for impressing a potential across said control electrode to render said device conductive at instants predeterminable at will.

2. For use in supplying a load from a source of alternating potential, the combination comprising in effect a pair of electric discharge devices of the immersed-ignition electrode type each having a plurality of principal electrodes and a control electrode immersed in one of said principal electrodes interposed between said source and said load so as to transmit alternating current to said load, voltage divider means having a plurality of taps and connected in shunt with said devices, and means connecting the control electrode of each of said devices to a tap of said divider.

3. In combination, an electric discharge device of the immersed-ignition-electrode type having a plurality of principal electrodes and a control electrode immersed in one of said principal electrodes, a source of periodically pulsating potential, means for impressing a potential from said source between said principal electrodes, and voltage divider means energized from said source for impressing a potential in phase with said source across said control electrode to render said device conductive at instants predeterminable at will.

4. In combination, an electric discharge device of the immersed-ignition-electrode type having a plurality of principal electrodes and a control electrode immersed in one of said principal electrodes, a source of periodically pulsating potential, means for impressing a potential from said source between said principal electrodes, voltage divider means connected in shunt with said principal electrodes and having a plurality of taps, and means for connecting said control electrode to any one of said taps selected at will.

5. For use in supplying a load from a source of alternating potential, the combination comprising in effect a pair of electric discharge devices of the immersed-ignition-electrode type, each having a plurality of principal electrodes and a control electrode immersed in one of said principal electrodes interposed between said source and said load so as to transmit alternating current to said load, resistance means connected in shunt with the principal electrodes of said devices and having a plurality of intermediate taps, and means connecting the control electrode of each of said devices to a tap of said resistance means.

6. For use in supplying a load from a source of alternating potential, the combination comprising in effect a pair of electric discharge devices of the immersed-ignition-electrode type, each having a plurality of principal electrodes and a control electrode immersed in one of said principal electrodes interposed between said source and said load so as to transmit alternating current to said load, reactive means connected in shunt with the principal electrodes of said devices and having a plurality of intermediate taps, and means connecting the control electrode of each of said devices to a tap of said reactive means.

7. In combination, an electric discharge device of the immersed-ignition-electrode type having a plurality of principal electrodes and a control electrode immersed in one of said principal electrodes, a source of periodically pulsating potential, means for impressing a potential from said source between said principal electrodes, impedance means connected in shunt with said principal electrodes and having a plurality of taps, and means for connecting said control electrode to any one of said taps selected at will.

EDWIN H. VEDDER.